United States Patent
Avestruz et al.

(10) Patent No.: US 12,244,151 B2
(45) Date of Patent: Mar. 4, 2025

(54) WIRELESS POWER TRANSFER IN MODULAR SYSTEMS

(71) Applicant: The Regents of the University of Michigan, Ann Arbor, MI (US)

(72) Inventors: Al-Thaddeus Avestruz, Ann Arbor, MI (US); Akshay Sarin, Ann Arbor, MI (US); Shai Revzen, Ann Arbor, MI (US); Duncan Abbot, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 773 days.

(21) Appl. No.: 17/198,978

(22) Filed: Mar. 11, 2021

(65) Prior Publication Data
US 2021/0359544 A1    Nov. 18, 2021

Related U.S. Application Data

(60) Provisional application No. 62/988,283, filed on Mar. 11, 2020.

(51) Int. Cl.
*H02J 50/05* (2016.01)
*H02J 50/50* (2016.01)

(52) U.S. Cl.
CPC .............. *H02J 50/05* (2016.02); *H02J 50/50* (2016.02)

(58) Field of Classification Search
USPC ........................................... 320/108
See application file for complete search history.

(56) References Cited

U.S. PATENT DOCUMENTS

| | | | | |
|---|---|---|---|---|
| 9,106,203 B2* | 8/2015 | Kesler | ................ | H02J 7/00309 |
| 9,246,336 B2* | 1/2016 | Kurs | ....................... | H03H 7/40 |
| 11,626,811 B2* | 4/2023 | Riar | ....................... | H02J 50/12 |
| | | | | 363/78 |
| 2014/0183968 A1* | 7/2014 | Harrison | .................. | H02J 7/02 |
| | | | | 307/104 |
| 2019/0089197 A1* | 3/2019 | Mao | ..................... | H01F 27/363 |

FOREIGN PATENT DOCUMENTS

WO    2019226630 A1    11/2019

OTHER PUBLICATIONS

A. C. Sanderson, "Modular robotics: Design and Examples" in Proceedings 1996 IEEE Conference on Emerging Technologies and Factory Automation. ETFA'96, vol. 2. IEEE, 1996, pp. 460-466.
(Continued)

*Primary Examiner* — Mohammed Alam
(74) *Attorney, Agent, or Firm* — Lempia Summerfield Katz LLC

(57) ABSTRACT

A system includes a body comprising a conduction path, and first and second modules disposed along, and movable relative to, the body, each of the first and second modules including an energy storage device, a terminal, and a power management unit coupling the energy storage device and the terminal. The terminal of each of the first and second modules is capacitively coupled with the conduction path for bidirectional power transfer between the first and second modules via the conduction path.

12 Claims, 18 Drawing Sheets

(56) References Cited

OTHER PUBLICATIONS

A. P. Hu, C. Liu, and H. L. Li, "A novel contactless battery charging system for soccer playing robot" in 2008 15th International Conference on Mechatronics and Machine Vision in Practice. IEEE, 2008, pp. 646-650.
B. Salemi, M. Moll, and W.-M. Shen, "Superbot: A deployable, multi-functional, and modular self-reconfigurable robotic system" in 2006 IEEE/RSJ International Conference on Intelligent Robots and Systems. IEEE, 2006, pp. 3636-3641.
D. J. Perreault et al., "Opportunities and challenges in very high frequency power conversion" in 2009 Twenty-Fourth Annual IEEE Applied Power Electronics Conference and Exposition. IEEE, 2009, pp. 1-14.
F.-Y. Chen, J.-F. Chen, and R.-L. Lin, "Low-harmonic push-pull class-E power amplifier with a pair of LC resonant hetworks" IEEE Transactions on Circuits and Systems I: Regular Papers, vol. 54, No. 3, pp. 579-589, 2007.
G. Zulauf, S. Park, W. Liang, K. N. Surakitbovorn, and J. Rivas-Davila, "C oss losses in 600 V gaN power semiconductors in soft-switched, high-and very-high-frequency power converters" IEEE Transactions on Power Electronics, vol. 33, No. 12, pp.
H.-N. Kim et al., "The study on the wireless power transfer system for mobile robots" World Academy of Science, Engineering and Technology, International Journal of Electrical, Computer, Energetic, Electronic and Communication Engineering, vol. 4, No. 12, pp. 1744-1746, 2010.
J. Dai and D. C. Ludois, "Capacitive power transfer through a conformal bumper for electric vehicle charging" IEEE Journal of Emerging and Selected Topics in Power Electronics, vol. 4, No. 3, pp. 1015-1025, 2015.
J. R. Warren, K. A. Rosowski, and D. J. Perreault, "Transistor selection and design of a VHF DC-DC power converter" IEEE Transactions on Power Electronics, vol. 23, No. 1, pp. 27-37, 2008.
J. Seo, J. Paik, and M. Yim, "Modular reconfigurable robotics" Annual Review of Control, Robotics, and Autonomous Systems, vol. 2, No. 1, pp. 63-88, 2019.

K. Agarwal, R. Jegadeesan, Y.-X. Guo, and N. V. Thakor, "Wireless power transfer strategies for implantable bioelectronics" IEEE reviews in biomedical engineering, vol. 10, pp. 136-161, 2017.
M. d. P. O. Cabrera, R. S. Trifonov, G. A. Castells, and K. Stoy, "Wireless communication and power transfer in modular robots" in Proc. of IEEE/RSJ IROS: Workshop on Reconfigurable Modular Robotics: Challenges of Mechatronic and Bio-Chemo-Hybrid Systems, 2011.
M. E. Karagozler et al., "Electrostatic latching for inter-module adhesion, power transfer, and communication in modular robots" in 2007 IEEE/RSJ International Conference on Intelligent Robots and Systems. IEEE, 2007, pp. 2779-2786.
M. Kline, I. Izyumin, B. Boser, and S. Sanders, "Capacitive power transfer for contactless charging" in 2011 Twenty-Sixth Annual IEEE Applied Power Electronics Conference and Exposition (APEC). IEEE, 2011, pp. 1398-1404.
M. Matsuo, T. Suetsugu, S. Mori, and I. Sasase, "Class DE current-source parallel resonant inverter," IEEE Transactions on Industrial Electronics, vol. 46, No. 2, pp. 242-248, 1999.
N. Eckenstein and M. Yim, "Design, principles, and testing of a latching modular robot connector" in 2014 IEEE/RSJ International Conference on Intelligent Robots and Systems. IEEE, 2014, pp. 2846-2851.
S. Sinha, A. Kumar, and K. K. Afridi, "Active variable reactance rectifier-a new approach to compensating for coupling variations in wireless power transfer systems" in 2017 IEEE 18th Workshop on Control and Modeling for Power Electronics (Compel). IEEE, 2017, pp. 1-8.
X. Zan and A.-T. Avestruz, "27.12 MHz bi-directional wireless power transfer using current-mode class d converters with phase-shift power modulation" in 2018 IEEE PELS Workshop on Emerging Technologies: Wireless Power Transfer (Wow). IEEE, 2018, pp. 1-6.
Erickson et al., "Fundamentals of power electronics," Springer Science & Business Media, 2d. ed., Section 19.3, pp. 705-726 (2001, 2007 ebook).

\* cited by examiner

WIRELESS POWER TRANSFER IN MODULAR SYSTEMS

CROSS-REFERENCE TO RELATED APPLICATION

This application claims the benefit of U.S. provisional application entitled "Wireless Power Transfer in Modular Systems," filed Mar. 11, 2020, and assigned Ser. No. 62/988,283, the entire disclosure of which is hereby expressly incorporated by reference.

BACKGROUND OF THE DISCLOSURE

Field of the Disclosure

The disclosure relates generally to wireless power transfer.

Brief Description of Related Technology

Robots are used in diverse, dangerous and distant environments. Robots have been made cheaper and more adaptable through the creation of modular robotic systems. In applications such as space exploration and colonization, rescue missions, and emergency operations, easily re-configurable modular robots often out-perform traditional fixed structure robots.

Powering a dynamic system, such as a modular robot, while maintaining ease of assembly and form-factor versatility, is a challenge. One approach equips each actuator module with local energy storage, such as a local battery. The modules are then charged as needed. However, the rate of battery exhaustion of each module may be different based on the function of the module. Hence, this will limit the robot's operation time to the time taken for the most power-hungry module to drain its local battery.

SUMMARY OF THE DISCLOSURE

In accordance with one aspect of the disclosure, a system includes a body comprising a conduction path, and first and second modules disposed along, and movable relative to, the body. Each of the first and second modules includes an energy storage device, a terminal, and a power management unit coupling the energy storage device and the terminal. The terminal of each of the first and second modules is capacitively coupled with the conduction path for bidirectional power transfer between the first and second modules via the conduction path.

In accordance with another aspect of the disclosure, a system includes a body including a plurality of conductors, and first and second modules disposed along, and movable relative to, the body. Each of the first and second modules includes an energy storage device, a plurality of terminals, and a power converter coupling the energy storage device and the plurality of terminals. Each power converter of the first and second modules is configured to provide bidirectional power transfer between the first and second modules via capacitive coupling between the plurality of terminals and the plurality of conductors.

In accordance with yet another aspect of the disclosure, a system includes a body including a plurality of conductors, and first and second modules disposed along, and movable relative to, the body. Each of the first and second modules includes an energy storage device, a plurality of terminals, and a power converter coupling the energy storage device and the plurality of terminals. Each power converter of the first and second modules includes a switched parallel resonant tank to support bidirectional power transfer between the first and second modules. The switched parallel resonant tank is configured to drive a series resonance. The series resonance includes a capacitive coupling between the plurality of terminals and the plurality of conductors, an inductance of the plurality of conductors, and a compensation inductor.

In connection with any one of the aforementioned aspects, the systems described herein may alternatively or additionally include or involve any combination of one or more of the following aspects or features. Each power management unit includes a power converter, the power converter being configured to convert between direct current (DC) power and radio frequency (RF) power. Each power converter includes an amplifier having a current mode, hybrid class D-class E topology. Each power converter has an inductive input impedance such that the amplifier is configured for zero-voltage switching. Each power converter includes a switched parallel resonant tank. Each of the first and second modules includes a compensation inductor, each compensation inductor coupling the switched parallel resonant tank and the terminal. The conduction path includes a track. Each of the first and second modules is movable along the track. Movement along the track is linear. The track includes a plurality of conductors. The track has a curved cross-sectional shape. Each of the first and second modules includes a wall. The terminal includes a conductive plate adjacent the wall such that the wall acts as a dielectric element of a capacitive coupling between the conduction path and the conductive plate. Each of the first and second modules includes a dielectric element disposed between the wall and the conductive plate. Each of the first and second modules includes an actuator. Each actuator is mechanically linked to the body. The first and second modules are interchangeable. Each power management unit includes a plurality of power converters, each power converter of the plurality of power converters being configured to convert between direct current (DC) power and radio frequency (RF) power. The first module includes a plurality of conductors, the plurality of conductors including the terminal. Each power management unit includes a power converter with a plurality of outputs. The plurality of conductors are excited by different frequencies such that the plurality of power outputs provide radio frequency (RF) power at differing frequencies. The plurality of conductors are excited by orthogonal codes. Each power management unit includes a power converter with a plurality of outputs, the plurality of power outputs providing radio frequency (RF) power at differing electrical phases. Each of the first and second modules further includes a modulator or a demodulator coupled to the power management unit for information transfer between the first and second modules via the conduction path. Each power converter includes an amplifier having a current mode, hybrid class D-class E topology. Each power converter has an inductive input impedance such that the amplifier is configured for zero-voltage switching. Each power converter includes a switched parallel resonant tank. Each of the first and second modules includes a plurality of compensation inductors, each compensation inductor of the plurality of compensation inductors coupling the switched parallel resonant tank and a respective terminal of the plurality of terminals. The plurality of conductors are arranged as a track. Each of the first and second modules is movable along the track.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
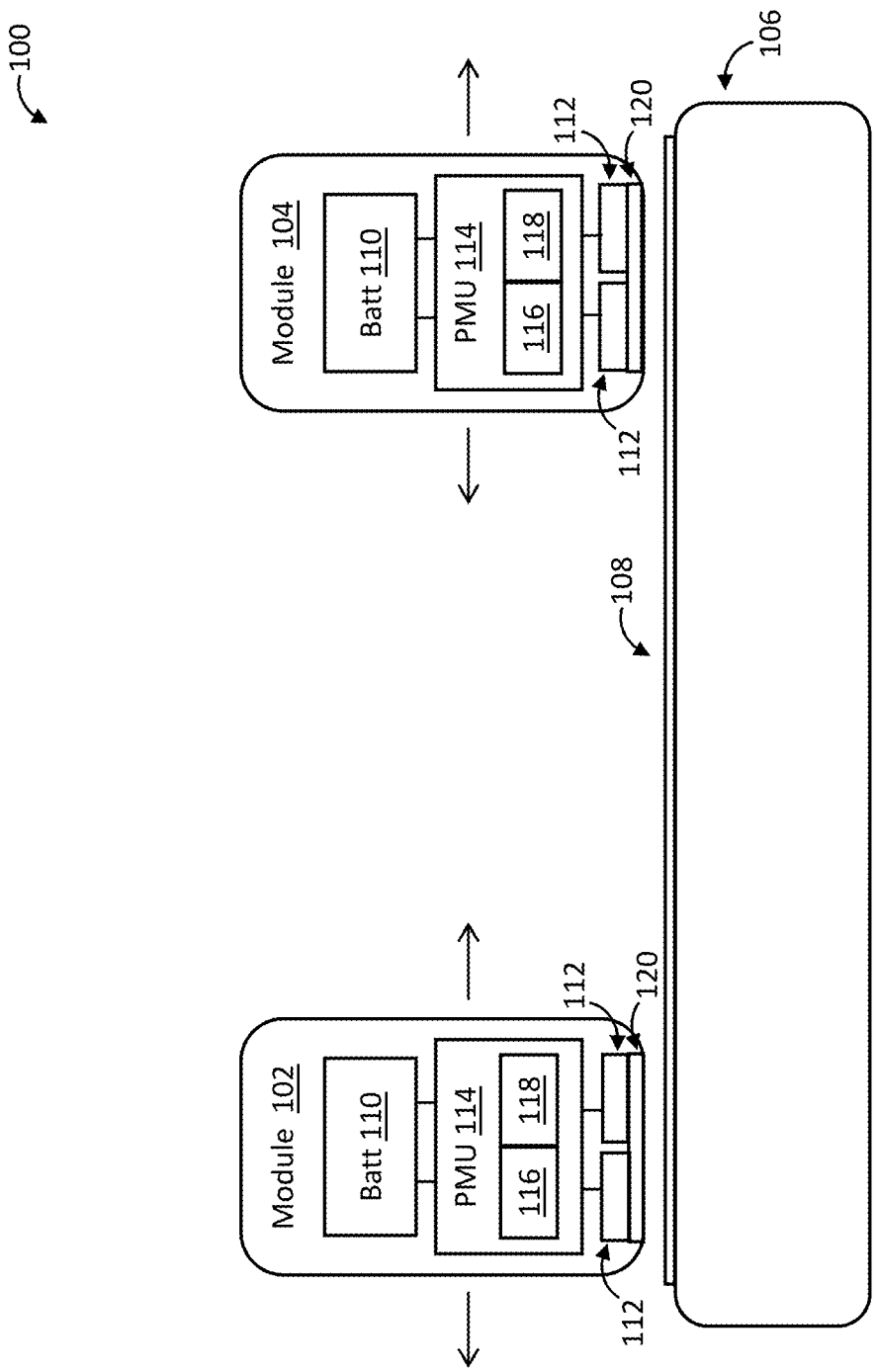
FIG. 1 is a schematic view of a modular system having a capacitive wireless power transfer system in accordance with one example.

The embodiments of the disclosed systems may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Systems for wireless power transfer between modules of a modular system are described. The disclosed systems overcome the problem of unequal power consumption in modular systems by configuring each module with the capability of bidirectional energy transfer. The modules are thus capable of sharing energy with one another. This allows a lesser-used module to transfer the unused energy to the power-hungry module. Each module may include a power converter or other power management unit to control the flow of energy.

The systems provide a contactless solution to enable energy exchange among the different modules. The systems may thus not rely on electrical contacts to transfer power. While the exchange of energy between modules may be achieved, e.g., with a galvanically-wired connection and conductive connectors, the use of any mechanical connectors limits the self-reconfigurability of the modules. These connectors are also unreliable and wear out over time causing unexpected electrical failures. The wear and tear also limit the operation in extreme conditions like corrosive (underwater) environments or high vibration surroundings. The wireless power transfer of the disclosed systems is, therefore, a useful solution to eliminate the mechanical connectors in modular robots and enable energy exchange between the modules. In some cases, the systems are also configured for information exchange between the modules through modulation of the flow of energy in accordance with the information.

The wireless power transfer of the disclosed systems is capacitive. The capacitive wireless power transfer avoids having pickup coils placed on the adjacent modules and the robot body, as in inductive systems. The disclosed systems therefore avoid the hindrance that pickup coils present to the flexibility of modular structures. The capacitive wireless power transfer (C-WPT) scheme for energy balancing is useful for modular robots because the electric fields are capable of being more easily confined.

The capacitive coupling may be established between the robotic module and a conduction path (e.g., a conduction track) on the body of the robot. For example, the body of the robot may be composed of, or otherwise include, a nonconductive composite material, such as fiberglass. In some cases, the robot or other system includes identical modules, such as multiple limbs. Depending on the terrain, one limb or other module may be used more than the other(s). Using capacitive wireless power transfer for energy exchange between different limbs helps prolong the operation time of the robot.

In some cases, a modified current-mode, class-D/class-E hybrid (CMCDE) topology is used to implement the wireless power transfer. The topology may include a switched parallel resonant circuit driving a series resonance. The topology may be designed to be resilient to nominal changes in the robot dimensions (e.g., as a result of operation) by appropriately selecting the resonant components.

Although described in connection with modular robots, the disclosed systems may be applied to a wide variety of modular systems. For instance, the modular system may include one or more mobile vehicles (e.g., battery-powered cars) or other mobile units. In another example, the modular system includes a prosthetic limb with a joint. Other types of biologically inspired or bio-imitation systems may incorporate the wireless power transfer techniques described herein. Any type of module(s) may benefit from the power sharing or management provided by the disclosed systems. The nature and characteristics of the modules of the disclosed system may vary accordingly.

FIG. 1 is a schematic diagram of a system 100 configured for wireless power exchange between two modules 102, 104 in accordance with one example. The system 100 may be or include a robot. For example, the system 100 may be a modular robotic system. The robot or other system 100 includes a body 106 that, in turn, includes a conduction path 108. In this case, the conduction path 108 is or includes a conduction line or track. The modules 102, 104 may or may not be identical or otherwise interchangeable. For instance, the modules 102, 104 may be configured as, or otherwise include, a limb of the robotic system 100. Additional or alternative modules may be included.

The modules 102, 104 are disposed along, and movable relative to, the body 106. Each module 102, 104 may be configured as, or otherwise include, an actuator. The modules 102, 104 may accordingly be referred to herein as "actuator modules." In some cases, the actuator is configured to move the module 102, 104 relative to the body. The functionality of the actuator may vary. In this example, the modules 102, 104 are configured to slide or otherwise linearly move along the conduction path 108. The movement may vary in other cases. For instance, the movement may be rotational. The actuator and/or other component of the module 102, 104 may be mechanically linked to the body 106. The manner in which the modules 102, 104 are structurally, mechanically or otherwise coupled to, linked to, or otherwise engaged with the body 106 may vary.

Each of the modules 102, 104 includes an energy storage device 110, one or more terminals 112, and a power management unit 114 coupling the energy storage device 110 and the terminal(s) 112 (e.g., a pair or other plurality of terminals). In this case, the energy storage device 110 is or includes a battery. Other types of energy storage devices may be used, including, for instance, a supercapacitor. As described herein, the terminals 112 are capacitively coupled with the conduction path 108 for bidirectional power transfer between the modules 102, 104 via the conduction path 108.

The power management unit 114 may include a controller or other processor 116 and a power converter 118. The processor 116 may be configured to generate switch control signals for the power converter 118. The control signals may be generated by the processor 116 in accordance with pattern data. The pattern data may be used by the processor 116 to generate the switch control signals. The pattern data may be, include, or otherwise be indicative of, a code sequence (e.g., pulse sequence). The pattern data may include or be representative of the codes as well as the timing of the codes. The switch control signals may be arranged to generate half-sine wave current waveforms, as described herein.

The processor 116 may be or include a field programmable gate array (FPGA) or a microcontroller. Other types of processors may be used. For instance, a variety of different digital circuits (e.g., digital integrated circuits) and analog circuits (e.g., analog integrated circuits) may be used and configured to generate the control signals. Mixed-signal integrated circuits may also be used.

Each switch may be a ground-referenced switch. Each switch may be or include a field effect transistor (FET), such as a GaN FET, or other transistor or active switch. Each switch may have a gate or other control terminal to which the control signal is applied to control the state of the switch, i.e., open or closed. Using the control signals, the switches of the two modules may be operated at a 50% or other duty cycle in a complementary manner. A phase shift between the switches of the two modules may be added to achieve or establish a desired power flow direction, as described herein.

In some cases, the system 100 may further include a central controller or other processor. The central controller may be in communication with the processors of the modules to synchronize the switching of the modules. Alternatively or additionally, the processors of the modules may be in communication with one another.

FIG. 1 shows the basic theory for energy balancing between the actuator modules 102, 104. The modules 102, 104 are disposed and used at different positions in the robotic system 100. The operation of the robotic system 100 causes the module 102 to be used more than the module 104. The power drawn from the battery 110 of the module 102 is more than the power drawn for the module 104. To balance the battery use of the two, the module 104 transfers power to the module 102. In this scenario, the module 104 may be considered the transmitter module. The module 102 may be considered the receiver module. The roles may be reversed in other scenarios. The power transfer may thus be bidirectional, as described herein.

As shown in Figure s 1 and 2, to transfer power between the modules 102, 104, a wall of each module 102, 104 is capacitively coupled to the conduction track 108 on the body 106.

As described herein, the power management unit 114 of the transmitter module 104 converts the battery's direct current (DC) power to radio frequency (RF) power and delivers the RF power capacitively to the conduction track 108. The RF power is then picked up by the capacitive coupling between the receiver module 102 and the conduction track 108, and then converted to DC power for charging the battery 110 of the module 102.

The vertical distance between the conduction track 108 and the actuators 102, 104 determines the coupling capacitance. Thus, the modules can slide horizontally or otherwise move along the conduction track 108 and maintain continuous or constant power transfer.

Figure 2:
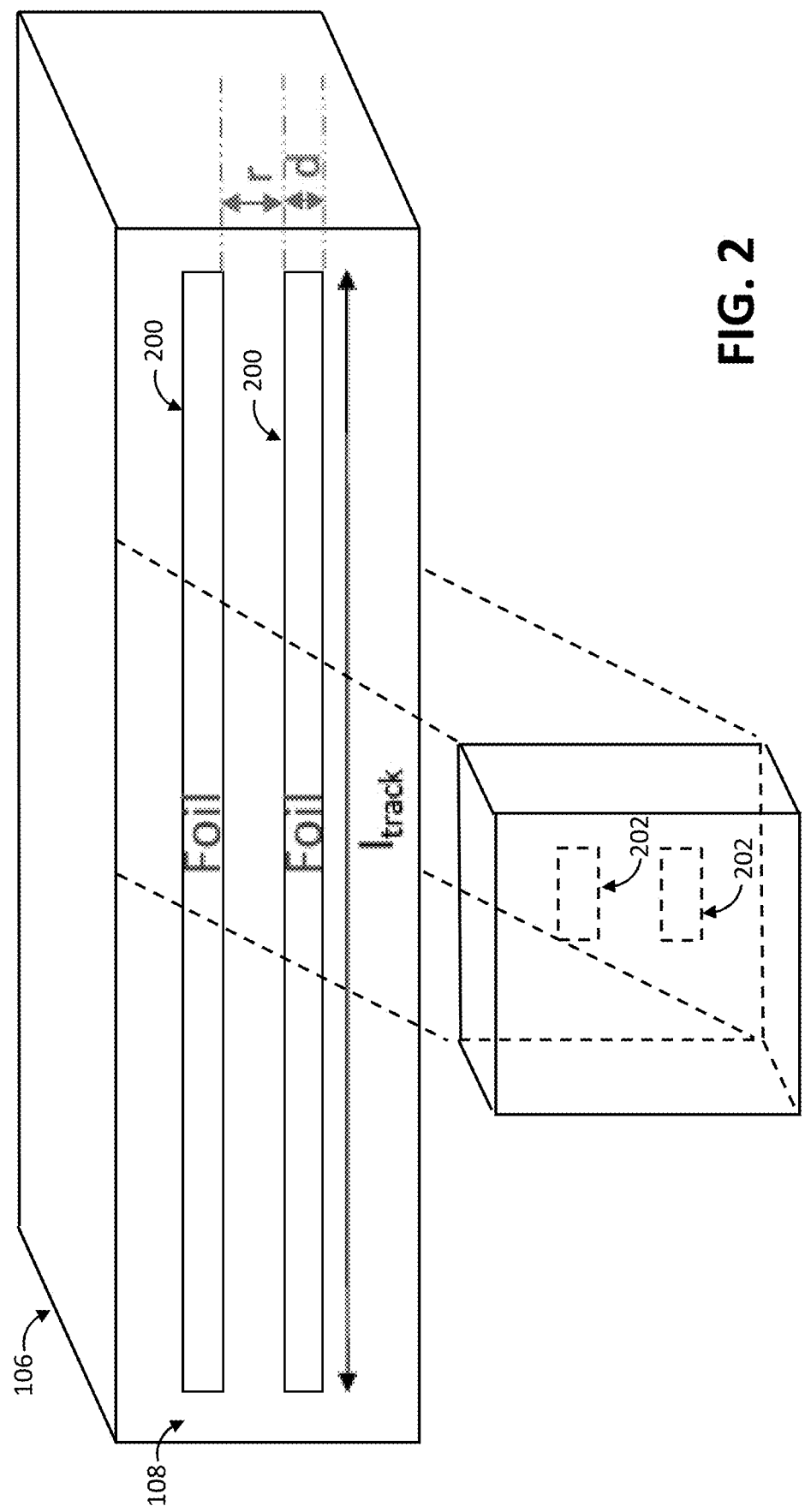
FIG. 2 is a schematic, perspective view of a conduction track of a capacitive wireless power transfer system in which a module slides along the conduction track in accordance with one example.

As shown in FIGS. 1 and 2, the terminals 112 of each module 102, 104 may include a conductive plate (e.g., a copper plate) along a wall or other boundary of the module 102, 104. The plate forms a capacitor with the conductive track 108. The wall or other boundary may be nonconducting and thus act as a dielectric for the capacitor.

In the example of FIG. 1, a dielectric element 120 is disposed between the wall and the plates. In some cases, the dielectric element 120 may include a low loss dielectric material. For example, the dielectric element 120 may include a film or sheet of polyethylene (HDPE) or polytetrafluoroethylene (PTFE). The composition, configuration, construction, positioning, and other characteristics of the dielectric element may vary from the example shown. For instance, a dielectric element may be disposed in any manner between the terminal of the module and the conductive path. Other types of dielectric materials may be used, including, for instance, paste- or liquid-based dielectric materials. Alternative formulations for the dielectric element include barium titanate and/or titanium dioxide disposed in a petroleum jelly.

The size of each module 102, 104 may limit the area of the plate, and the wall and/or other dielectric thickness determines the distance between the plate and the conductive track 108. In some cases (e.g., small robots), the capacitance may be limited by the available area for a given wall thickness. For example, for a wall thickness of about 0.25 mm, the capacitance per unit area is about 3.5 pF/cm$^2$. For a plate area of about 25 cm$^2$, the total plate capacitance is about 90 pF. However, the power transfer may solely depend on the distance between the conductive track 108 and the module 102, 104. From FIGS. 1 and 2, it can be observed that as long as the distance between the conductive track 108 and the modules 102, 104 remains constant, the magnitude of the power transfer will be almost constant, insofar as the capacitance between the conductive track 108 and the module 102, 104 also remains the same. This capacitance depends on the distance and the area of plates, so the modules 102, 104 may be sliding over or along the conductive track 108 and still maintain constant power transfer.

FIG. 2 depicts an example of the conductive track 108 of the body 106 in greater detail. The track 108 may include any number of conductors. The configuration of the conductors may vary. In this example, the conductive track 108 includes a plurality (e.g., pair) of conductive strips 200. In this case, each conductive strip 200 is or otherwise includes conductive foil (e.g., copper or aluminum foil). The use of foil (or other flexible conductors) as the track 108 may preserve the flexibility of the body 106. Each strip 200 may be adhesively pasted or otherwise secured to an exterior surface of the body 106. Alternatively, the strips 200 may be disposed within or otherwise integrated with the body 106. The strips 200 are oriented in parallel to define the line of the conductive track 108. One of the modules 102 is shown spaced from the conductive track 108 for ease in illustration. The module 102 includes a plurality (e.g., pair) of terminals 202 spaced from one another to match the spacing of the conductive strips 200. Each terminal 202 may be or otherwise include a conductive plate.

The track 108 behaves inductively as long as the length of track ($l_{track}$), is much less than the wavelength ($\lambda$) of the frequency selected for power transfer ($l_{track} \ll \lambda$). The inductance ($L_{track}$) of the track depends on the dimensions of the track 108, $$L_{track} \approx \frac{\mu_0}{\pi} l_{track} \ln\left(4 + \frac{2r}{d}\right)$$

where r is the distance between the two tracks and d is the width of the track. Thus, for smaller lengths, the track may be modeled (see, e.g., FIGS. 4 and 5) with a series inductance and a small fringing capacitance.

Figure 3:
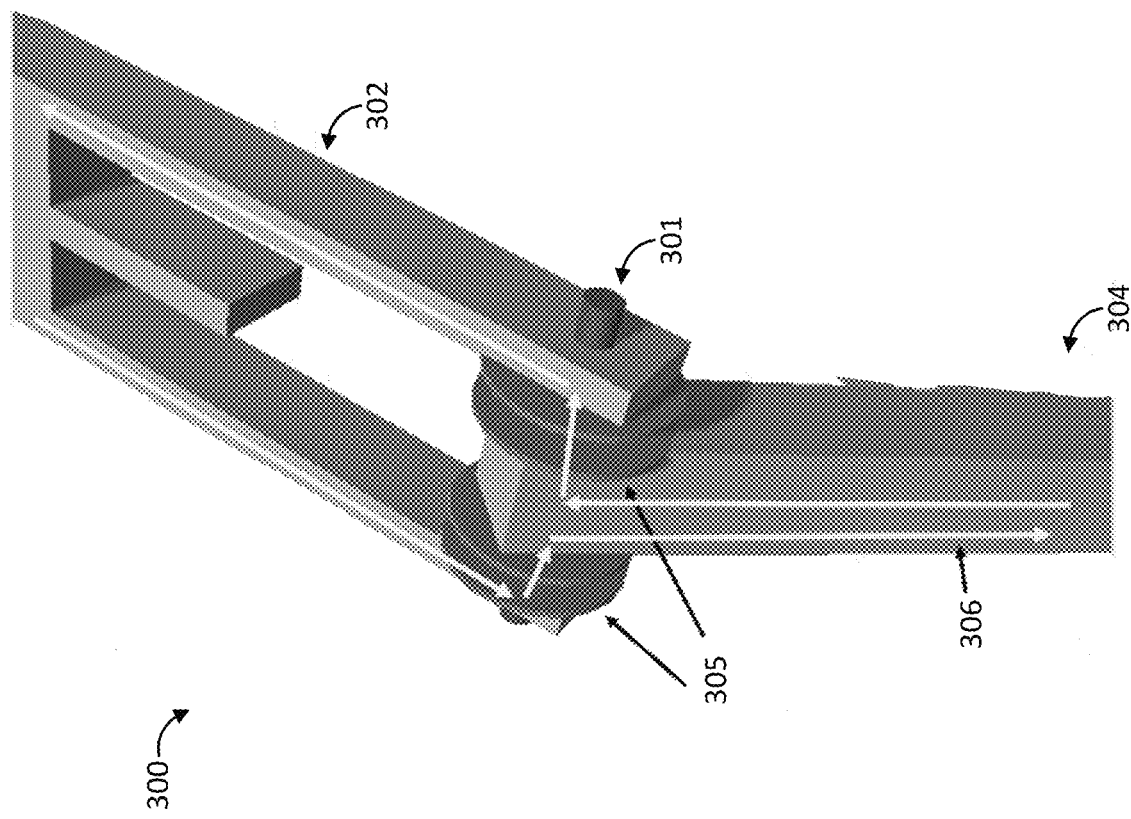
FIG. 3 is a schematic, perspective view of a robotic system having a module that moves relative to a body at a rotational joint with capacitive coupling for wireless power transfer in accordance with one example.

FIG. 3 depicts a system 300 configured for non-linear movement in accordance with one example. In this case, the system 300 includes a rotational joint 301 for rotational movement of an arm 302 or other component of the system 300 relative to a base 304 or other body of the system 300.

The capacitive coupling of the system 300 may be provided via one or more sets (e.g., pairs) of conductive plates 305. In this example, two pairs of disc-shaped plates 305 are disposed about an axis of the joint 301. The plates 305 adjacent to the base 304 may serve as part of the conduction path in this case. Power (depicted schematically at 306) may be transferred to and from the arm 302 to another component (not shown) of the system 300 coupled to the base 304. The power 306 may flow to the other component through conductors disposed within the base 304 as shown.

Figure 4:
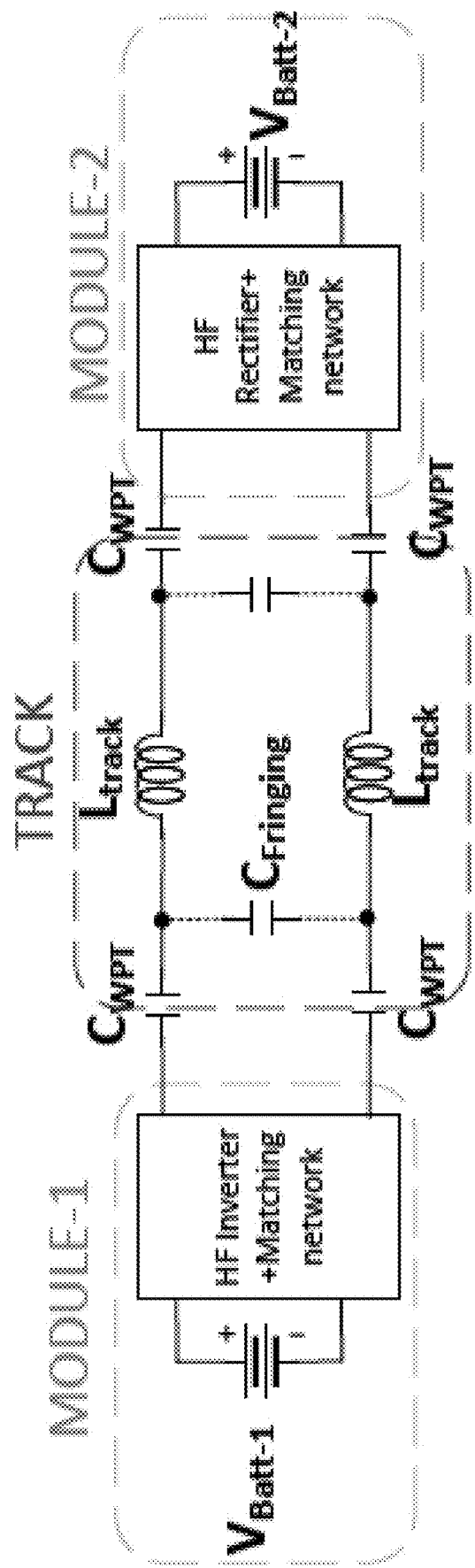
FIG. 4 is a schematic block diagram of a system for capacitive wireless power transfer between modules via a conduction path in accordance with one example.

FIG. 4 schematically depicts a system with capacitive wireless power transfer in accordance with one example. The system includes two modules labeled module-1 and module-2. Each module includes a power management unit and a battery. The power management unit includes a power converter for the wireless power transfer between the two modules. In this case, the power converter includes a high frequency rectifier and a matching network.

The system includes a track as a conduction path. The track between the modules is modelled using lumped circuit elements because of the relative track length (e.g., $l_{track} \ll \lambda$). For transferring power through the coupling capacitance, the dc power from the battery is converted to high frequency, alternating current (AC) ac power. This power conversion may be implemented in an efficient manner as described herein. Also as described herein, the power converter may be tolerant to variation in the length of the track (e.g., as a result of movement of one or both of the modules). Each power converter may be configured to receive power as well, e.g., capable of acting as an active rectifier. Thus, each power converter may be both bi-directional and resilient to the loading conditions.

Such bidirectional and resilient functionality may be achieved by including a high frequency inverter with a matching network to compensate for the capacitance. In some cases, a half-bridge or full-bridge inverter with a series resonance circuit may be used. However, the use of the floating gate drives in the half-bridge inverter may limit the operating frequency, and hence the miniaturization of the robotic modules.

In other cases, a push-pull class-E converter may be used. In such cases, the choke inductors carry the dc current. The track inductance, coupling capacitance and the compensating inductors all form a series resonant circuit. The push-pull class-E converter includes two ground-referenced switches and absorbs both the switch parasitic capacitance as well the track inductance in the resonant network. However, the push-pull class-E converter is not resilient to the changes in the track inductance.

For achieving high efficiency operation, the amplifier may employ zero-voltage switching (ZVS) to avoid the switching loss at higher frequencies. Hence for zero voltage switching, it is useful for the input impedance $Z_{in}$ (see FIG. 6) to be inductive. The impedance $Z_{in}$ is given as follows:

$$Z_{in}(s) = \frac{1}{sC_P} \parallel Z_s \text{ where}$$

$$Z_s = s(L_c + L_{track}) + \frac{1}{s\frac{C_{WPT}}{4}} + \frac{1}{sC_P}.$$

For a push-pull class-E amplifier, the input impedance is inductive (hence, achieves zero voltage switching) only for a small range of frequencies. The input impedance of push-pull class-E amplifier becomes capacitive even for a small 10% change in the series resonant inductor, thereby losing zero voltage switching. Thus, other amplifier topologies may be used for modular, re-configurable and other robots for which the track inductance may vary (e.g., depending on the size and the functionality of the robot.)

Figure 5:
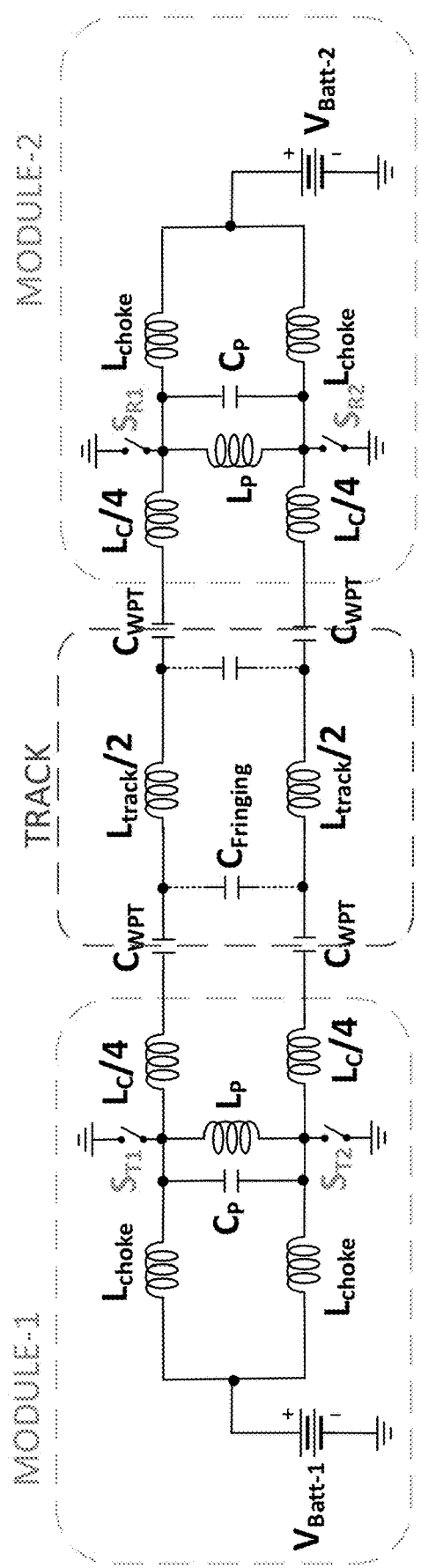
FIG. 5 is a circuit diagram of a system for capacitive wireless power transfer between modules via a conduction path in accordance with one example.

FIG. 5 depicts two modules having power management units configured to overcome the parameter sensitivity challenge. In this case, the power management unit includes a power converter having a current-mode hybrid class-D/class-E (CMCDE) amplifier. The end-to-end circuit for wireless power transfer using a CMCDE amplifier adds a parallel inductor $L_P$ to the topology of the push-pull class-E amplifier. As described herein, the additional inductor provides another degree of freedom for making the design resilient to changes in the track inductance.

The CMCDE amplifier shown in FIG. 5 includes a CMCD tank at either end driving a series resonant circuit formed by the coupling capacitance (e.g., the wall capacitance or other capacitance between the module and the body), the track, and the compensating inductor. The CMCDE amplifier may be configured to achieve zero voltage switching and/or zero voltage-derivative switching. In this case, the CMCDE amplifier includes a switched parallel resonant tank driving a series resonance.

The CMCDE amplifier for the capacitive wireless power transfer between modules may be configured as follows. For the purpose of design and analysis, the passive components are assumed to be ideal. The switching of the two modules undergoing energy exchange may be synchronized using a centralized controller.

Figure 6:
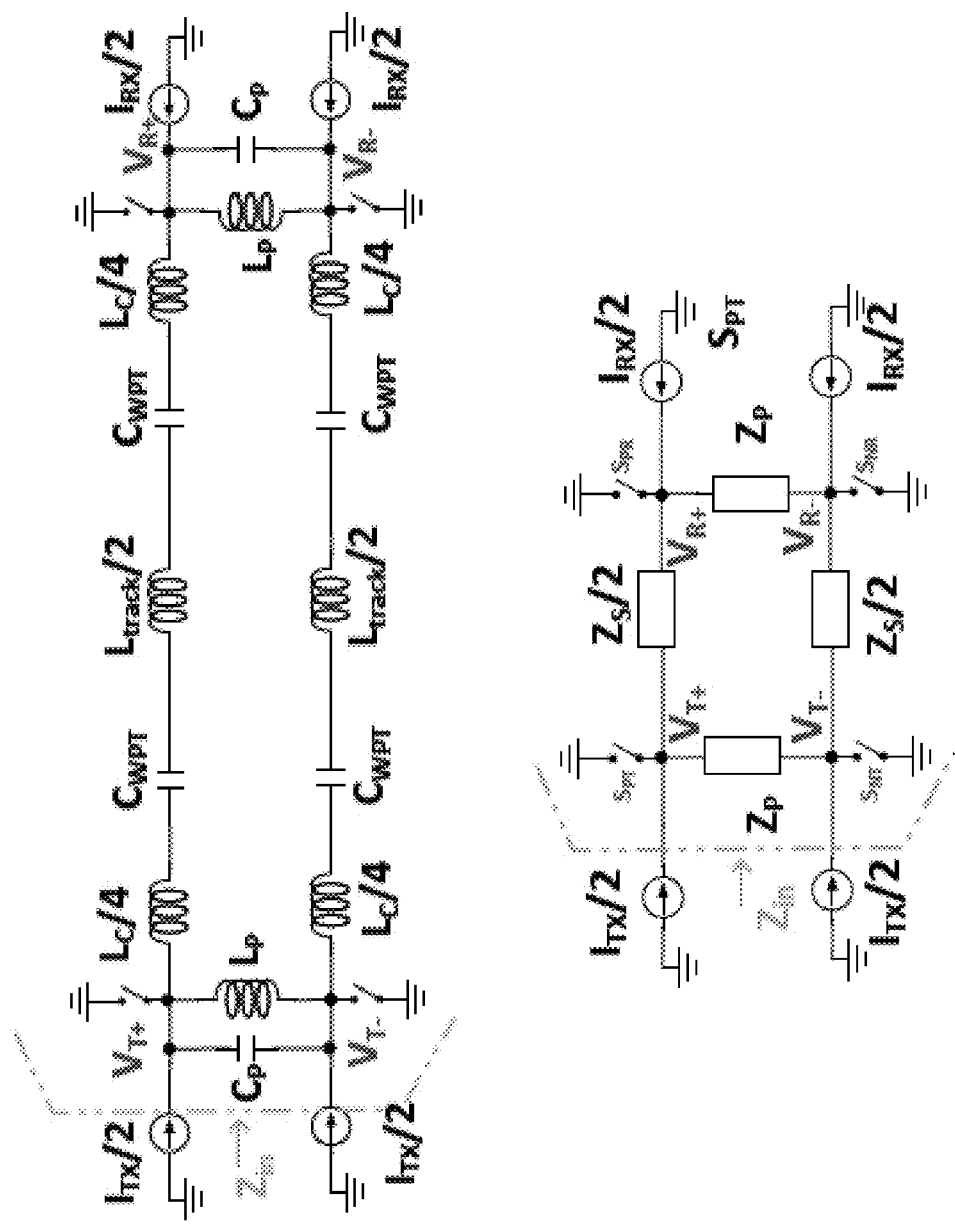
FIG. 6 depicts circuit diagrams that model capacitive wireless power transfer via a conduction path in accordance with one example.
Figure 7:
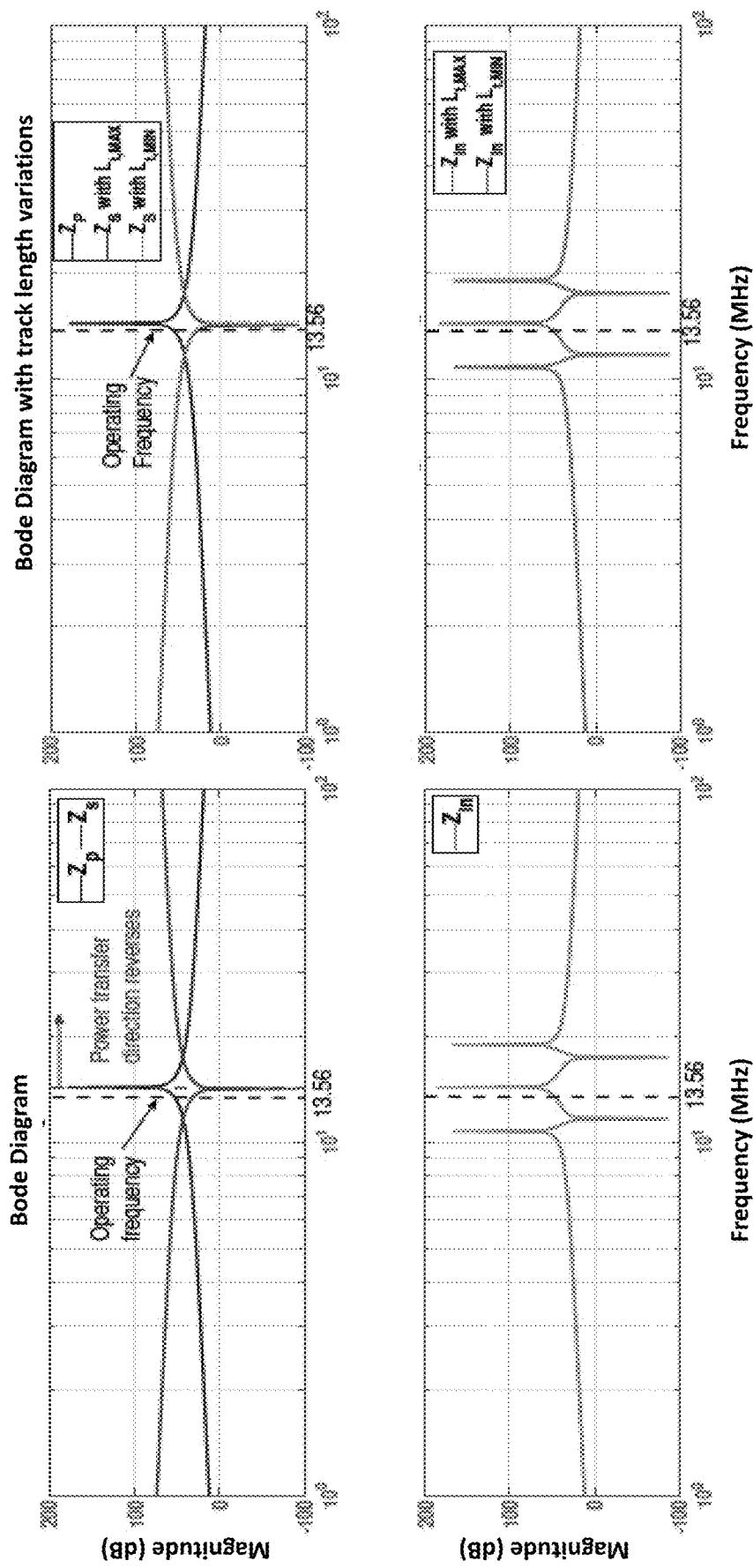
FIG. 7 depicts graphical plots of Bode diagrams of capacitive wireless power transfer systems in accordance with multiple examples.

FIG. 6 depicts an equivalent circuit of the CMCDE amplifiers, the capacitive coupling, and the conductive track or other path. The choke inductors are replaced by constant current sources. Circuit representations are provided for the end-to-end wireless power transfer between two modules. The CMCDE amplifier includes a switched parallel resonant tank driving a series impedance. The input impedance for a CMCDE amplifier is as follows:

$$Z_{in} = Z_P \parallel (Z_P + Z_S)$$

$$= \frac{Z_P(Z_P + Z_S)}{2Z_P + Z_S}$$

where the impedance $Z_P$ is $$Z_P = \frac{sL_P}{s^2 L_P C_P + 1}$$

and the impedance $Z_s$ is $$Z_S = s(L_C + L_{track}) + \frac{1}{s\frac{C_{WPT}}{4}}.$$

The impedance, $Z_P$ and $Z_S$ may be selected to make the input impedance $Z_{in}$ inductive for a wide range of track inductance, hence achieving zero voltage switching.

The two switches of a module may be operated in a complementary manner with a small overlap time between them, as with a current mode class-D (CMCD) amplifier. Under steady state operating conditions, the dc voltage across the lossless choke inductors may be zero, hence $$\overline{V_{T+}} = \overline{V_{T-}} = d_{dc_{TX}}$$

$$\overline{V_{R+}} = \overline{V_{R-}} = V_{dc_{RX}}$$

where each voltage denoted with a line is an average value of a variable over a switching period in steady-state. $V_{dcTX}$ and $V_{dcRX}$ are the battery voltages for transmitting and receiving modules respectively. If the modules are all identical and hence the battery voltages for the transmitting and receiving modules will be same, $V_{dcTX} = V_{dcRX}$. However, under different state of charge of the batteries, the two dc voltages may also differ. For high-Q operation, the drain voltages of each switch, i.e., $V_{T+}, V_{T-}, V^{R+}$, and $V_{R-}$ may be half sinusoidal, e.g., approximately half-sinusoidal. Hence, the peak drain voltages are related to the dc voltage as follows:

$$V_{TPK} = V_{T+PK} = P_{T-PK} = \pi V_{dc_{TX}}$$

$$V_{RPK} = V_{R+PK} = V_{R-PK} = \pi V_{dc_{RX}}$$

The phase-shift between the differential transmitting and receiving voltages and the impedance $Z_S$ calculated at the switching frequency determine the power transfer magnitude and direction. If the transmitting end voltage is $V_{TPK} \sin(\omega t)$, and the receiving end voltage is $V_{RPK} \sin(\omega t + \theta_R)$ and the impedance is $Z_S \angle \theta_S$, then the power transferred may be approximated as:

$$P_{TR} = \frac{V_{TPK} V_{RPE}}{Z_S} \cos(\theta_S - \theta_R).$$

Thus, for a given phase-shift between two modules, the impedance of the series circuit determines the direction of power flow. The self-resonant frequency $\omega_S$ of the series impedance is as follows:

$$\omega_S = \frac{1}{(L_C + L_{track})\frac{C_{WPT}}{4}}.$$

If the switching frequency $\omega$ is less than $\omega_S$, the track impedance is capacitive, and for $\omega$ greater than or equal to $\omega_S$, the track impedance is inductive.

The switching frequency, and the self-resonant frequency of the series impedance (the compensating inductors and the track) together determine the optimal phase difference between the transmitting and receiving module for maximum power transfer. Neglecting the losses in the series impedance, the optimal phase difference between the transmitting and receiving module is given as $$\theta_R = \begin{cases} +90°, & \text{if } \omega \geq \omega_S \\ -90°, & \text{otherwise.} \end{cases}$$

Values for the resonant components of the CMCDE amplifier (e.g., $L_P$, $C_P$, and $L_C$) may be selected given the coupling capacitance $C_{WPT}$, the maximum track length $(L_{tMAX})$, switch selection, and an operating frequency $f_{sw}$. The coupling capacitance and the maximum track length may be determined by the physical size of the modules. The switch and operating frequency selection can be performed by framing the optimization problem for maximizing the end-to-end efficiency of power transfer. However, the operating frequency and switch may be pre-determined.

The CMCDE amplifier may be configured such that the amplifier is resilient to the changes in the track length. The following procedure may be used.

Step 1: Given the switch output capacitance ($C_{OSS}$), determine the parallel inductance LP such that the parallel tank behaves inductively at the switching frequency. An external capacitance $C_{ext}$ may be added for fine-tuning. To make the parallel tank inductive, the resonant frequency of the parallel tank $f_P$ may be slightly greater than the operating frequency, $f_{sw}$, i.e. $f_P > f_{sw}$.

Step 2: With the maximum track inductance, obtain the series inductance value such that the resonant frequency of the series impedance $Z_S$ is the same as that of the parallel tank, i.e., $$(L_C + L_{track,Max})C^{WPT} = L_P C_P$$

Step 3: Check if the input impedance $Z_{in}$ is still inductive.

To understand the design process, consider the second equivalent circuit shown in FIG. 6. For ideal operation, the series impedance $Z_S$ is minimal and the parallel impedance is as large as possible. Under these conditions, the track and coupling capacitance behave as a short circuit at the operating frequency. The series impedance $Z_S$ acta as short circuit at resonance and the parallel impedance $Z_P$ acts as an open circuit at resonance. However, to achieve zero voltage switching, both the tanks may be tuned at a frequency slightly above resonance. The parallel impedance effectively acts as an inductance below the resonant frequency and the series tank effectively acts as a capacitance.

Depending on the quality factors and the selected component values, the impedance beyond the parallel inductor either behaves inductively or capacitively. If the impedance acts as an inductance, the overall inductance of the tank will decrease, and overall impedance $Z_{in}$ will be inductive at the operating frequency. However, if the impedance is capacitive at the operating frequency, the series compensating inductor is increased to maintain zero voltage switching.

An example having a battery voltage of 20V is now described. A switching frequency of 13.56 MHz is selected and GaNFET, GS61004B (100V, 15 m) commercially available from GaN Systems is used for the switches. A wall thickness of 0.2 mm with 5 cm 5.5 cm copper plates yields a coupling capacitance of 125 pF. The track is configured to have the same width as the copper foil with a spacing of 1 cm between the two parallel strips. The maximum length of the foil is 40 cm, which gives a maximum track inductance of 250 nH. The minimum track length is 20 cm, thus giving a minimum track inductance of 125 nH.

In Step 1, the switch drain voltage for a dc voltage of 15V is 65V. At this drain voltage, the switch output capacitance is approximately 150 pF. For the parallel tank to be inductive.

$$L_P \le \frac{1}{w^2 C_P} = 760 \text{ nH}.$$

The inductance $L_P$ is set to 530 nH to account for switch nonlinearity and other parasitic impedance. Simulation of the parallel circuit may be used to appropriately select parallel tank such that the tank behaves inductively at the operating frequency.

In Step 2: a series resonant inductor $L_{SR}$ that resonates with four series coupling capacitances of 125 pF at the operating frequency, $$L_{SR} = \frac{1}{\omega \frac{C_{WPT}}{4}},$$

or $L_{SR}$=4.4 µH, is determined.

In Step 3, a compensating inductor $L_C$ is determined such that:

$$L_C \le L_{SR} - L_{t_{MAX}} = 4.15 \mu H$$

An inductance $L_C$=4 µH may be used to account for model uncertainties.

In Step 4, the input impedance $Z_{in}$ is checked for both $L_{tMAX}$ and $L_{tMIN}$ to ensure the impedance is inductive. As a result, the converter maintains zero voltage switching under all possible track lengths.

Figure 11:
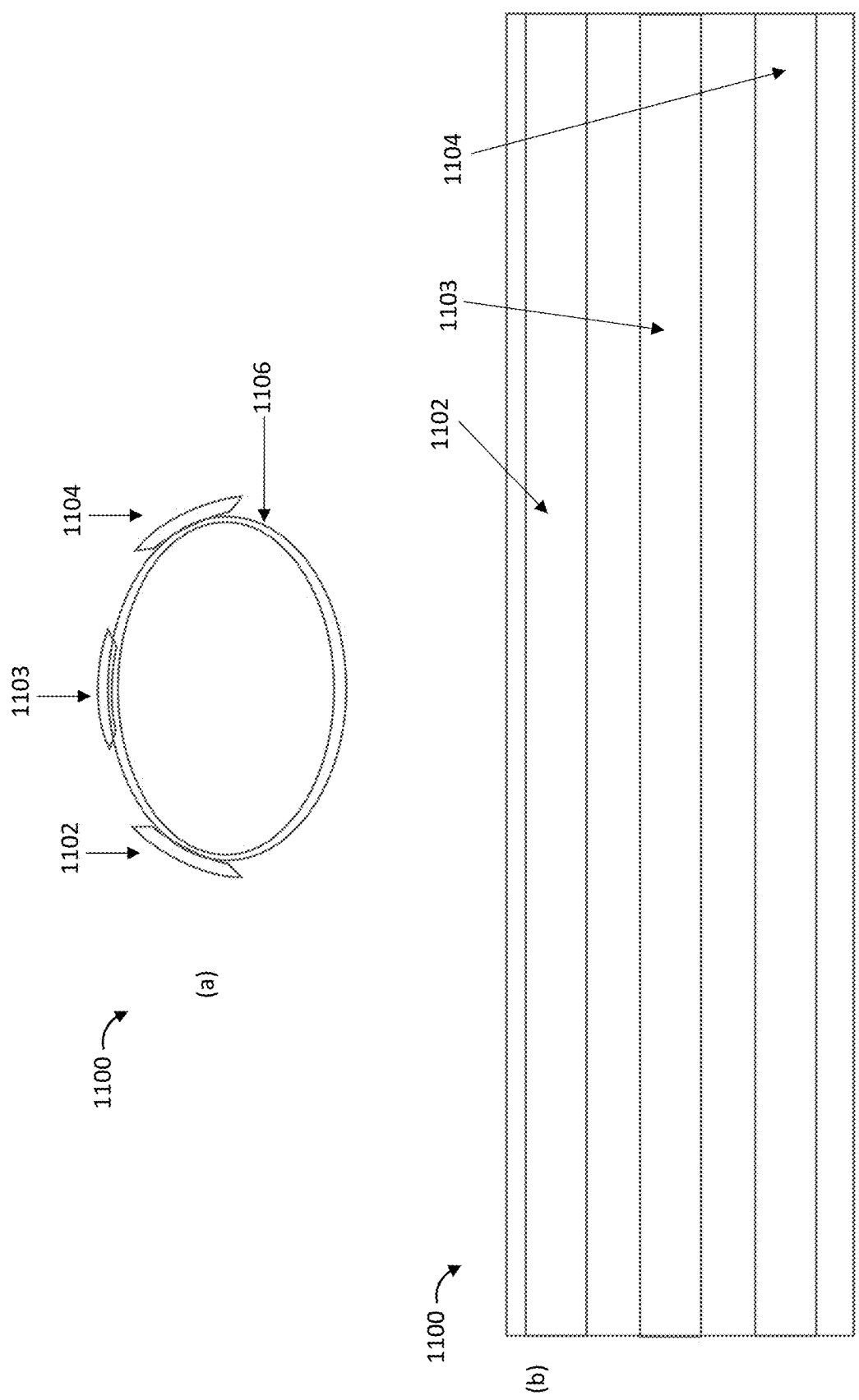
FIG. 11 are schematic cross-sectional and plan views of a body of a modular system having a plurality of conductors in accordance with another example.

FIG. 11 shows the bode plot of the magnitudes of $Z_P$, $Z_S$ and $Z_{in}$ for the above-described example. The first two Bode plots of FIG. 11 depict the impedance magnitudes of $Z_P$, $Z_S$ and $Z_{in}$ with maximum track length. The resonant frequencies, $f_P$ and $f_S$ are chosen to be slightly higher than the operating frequency of 13.56 MHz. At this operating point the input impedance is indeed inductive.

The second two Bode plots of FIG. 11 depict the impedance magnitude of $Z_{in}$ with variation in track length. The impedance $Z_{in}$ remains inductive under all variations of track length. Thus the CMCDE amplifier maintains zero voltage switching under all track variations.

For the chosen design, at the operating frequency, the series impedance is capacitive whereas the parallel impedance is indeed inductive. The magnitude of the parallel impedance at the operating frequency is greater than the series impedance. Thus the effective input impedance at the operating frequency is inductive. If the operating frequency were to become greater than the series resonant frequency, $f_S$, for the same phase shift between the transmitter and the receiver module, the power transfer direction would reverse. Therefore, it may be useful that, for all possible track lengths, $f_S$ is greater than f. Because the system is designed for the maximum track length with $f_S$ greater than or equal to f, the reduction in track length (hence the increase in frequency $f_S$) ensures that power transfer remains in the same direction. Additionally, from the other plots of FIG. 11, it can be verified that the input impedance under the track variation indeed remains inductive, thus maintaining zero voltage switching.

Figure 8:
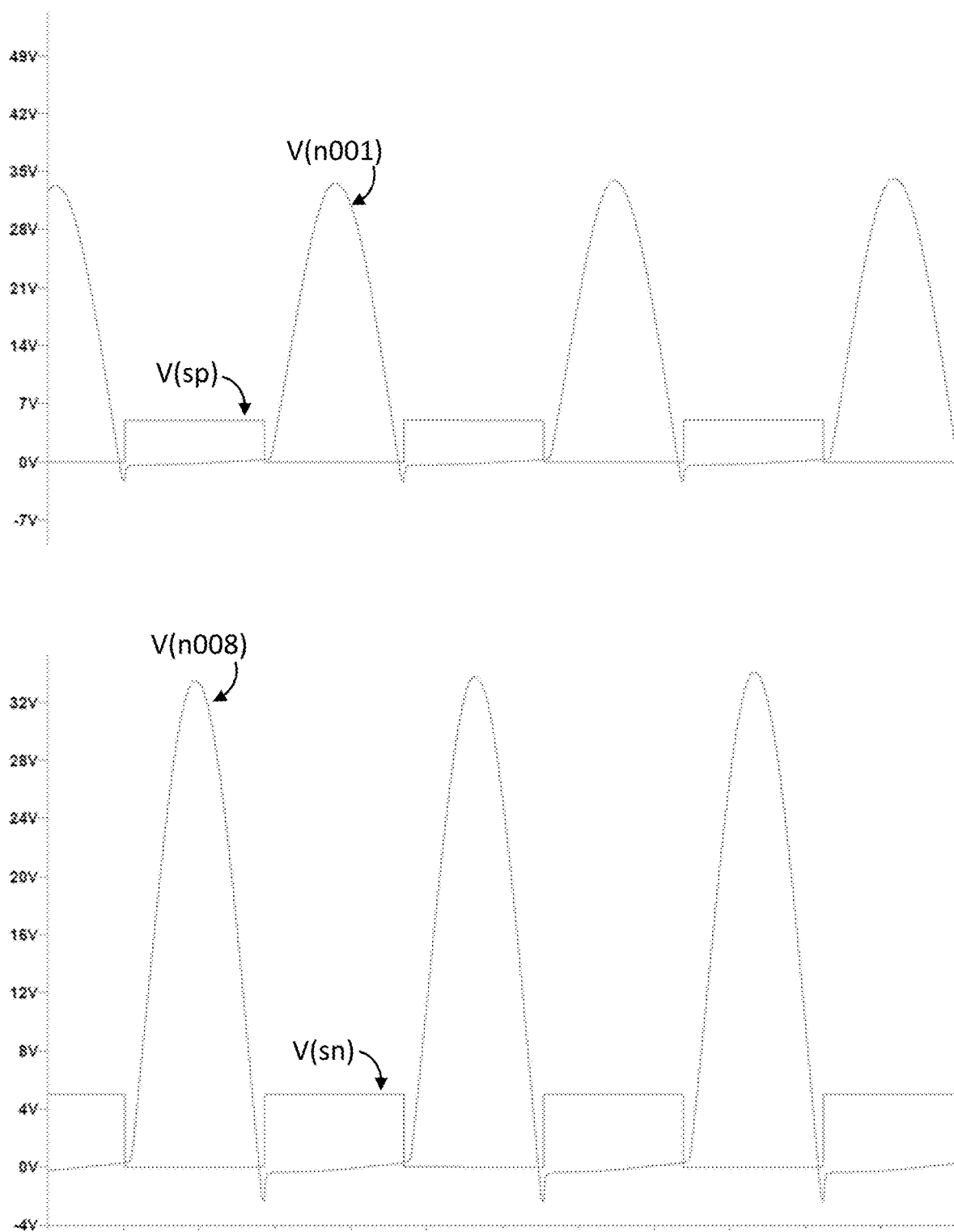
FIG. 8 depicts graphical plots of signal traces of control signals for switches, and voltages across switches, of a capacitive wireless power transfer system in accordance with one example.

Examples of drain voltages and gate voltages for the switches of the converters of the above-described systems are depicted in FIG. 8.

A system was built with components having the following parameters set forth in the table below. The component parameters are provided with the understanding that the parameters may vary considerably in other systems.

| Component | Value | Description |
|---|---|---|
| GaN FET | GS61004p from GaN systems | 100 V, 15 mΩ, 120 pF |
| $C_{WPT}$ | 125 pF | Implemented between copper plates of dimensions 5 cm × 5.5 cm |
| $L_P$ | 530 nH | Single layered solenoid made using 5-mil thick foil with 5 turns and 2.5 cm diameter |
| $L_C$ | 3.8 µH | Two center tapped air-core solenoids made using single-layer foil conductors with a diameter of 4 cm |
| $C_p$ | 33 pF | S01542E330JV3S from Ichanson Technology |
| $L_{choke}$ | 56 µH | EPCOS B82111E Series |
| $f_r$ | 13.56 MHz | Resonant frequency |
| $L_{track}$ | 250 nH | Copper track made using 10 mill thick copper plates of maximum length 40 cm and width 5 cm |

The example transferred 20.5 W of power with dc-dc efficiency of 78.8% at a dc voltage of 20V at each end.

Figure 9:
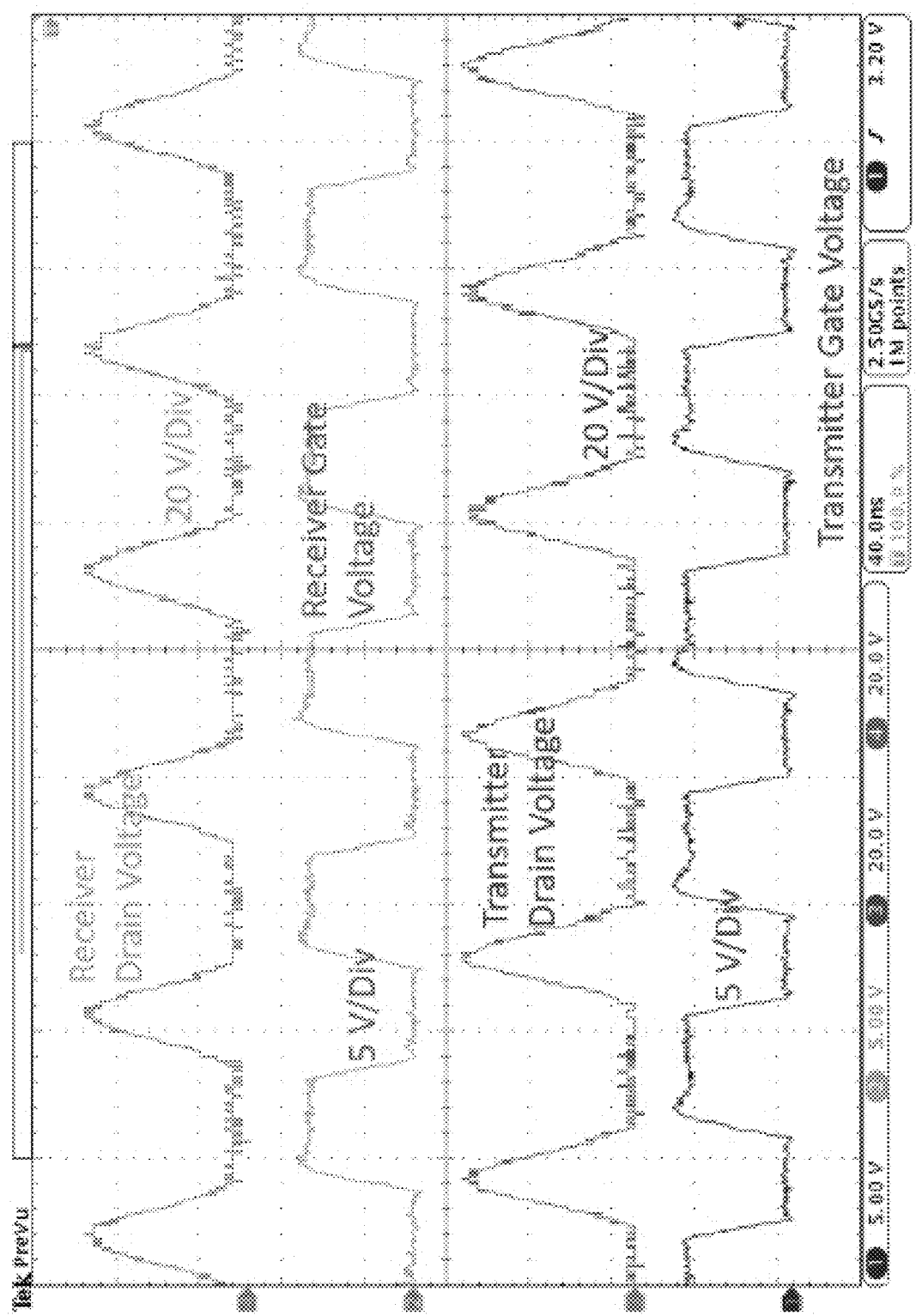
FIG. 9 depicts graphical plots of drain and gate voltages of transmitter and receiver switches of a capacitive wireless power transfer system in accordance with one example.

With reference to FIG. 9, it can be seen that the GaN FET switches indeed achieve zero voltage switching on either side with the differential drain voltage at either end being approximately sinusoidal.

The example transferred 20.47 W of power at 78.32% dc-dc efficiency for the minimum track length of 20 cm, thus confirming resilience to the changes in track length.

Figure 10:
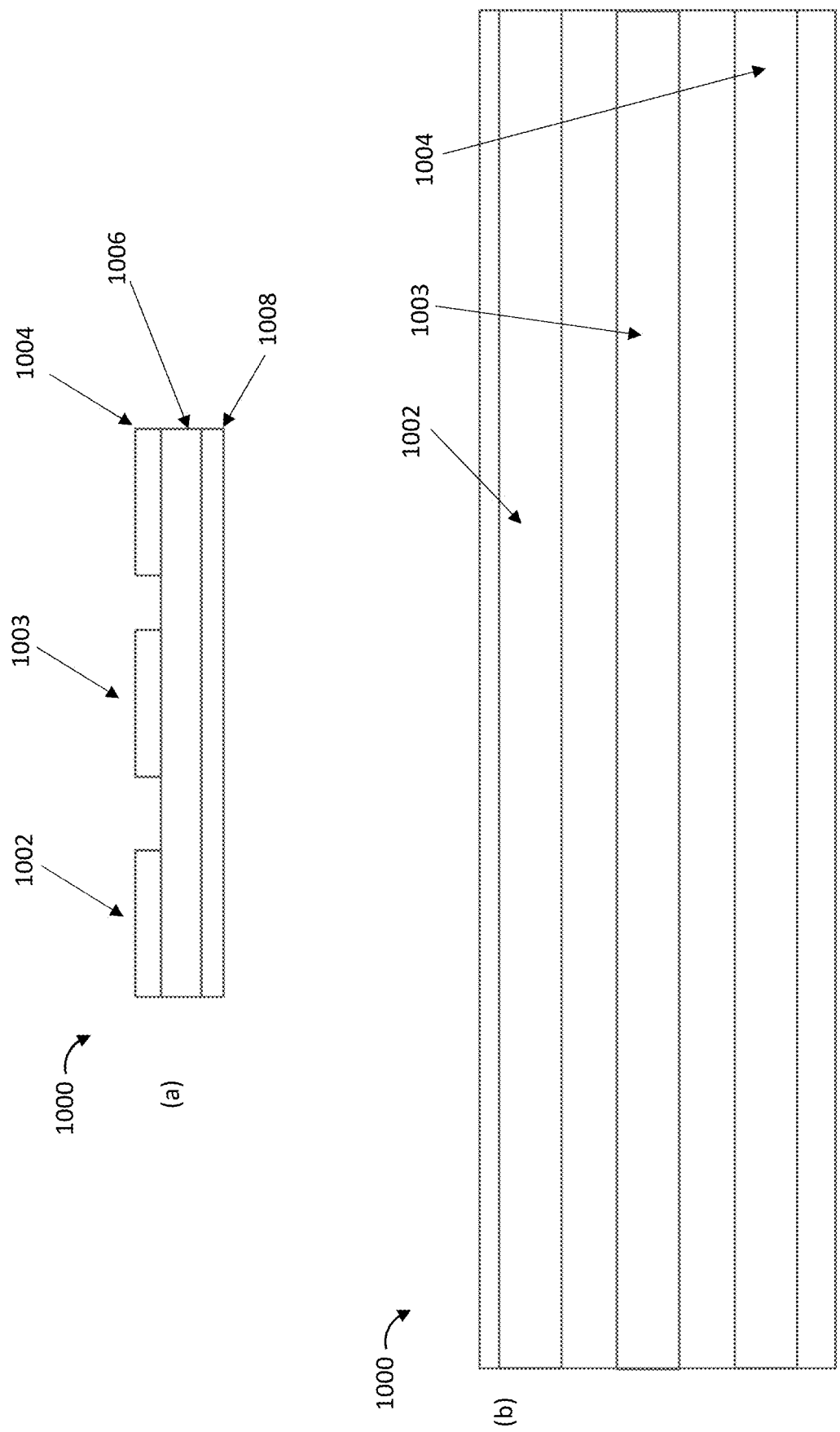
FIG. 10 are schematic cross-sectional and plan views of a body of a modular system having a plurality of conductors in accordance with one example.

FIG. 10 depicts an example of a track 1000 having multiple conductors 1002-1004. Part (a) depicts a cross-sectional view of the track 1000. Part (b) depicts a plan view of the track 1000. In this case, three conductors 1002-1004 are included, but the number may vary. Each conductor 1002-1004 may be patterned or otherwise configured as a strip. The conductors 1002-1004 may be mounted on, or otherwise supported by, a multi-layer substrate or other structure. In this example, the structure includes a dielectric layer 1006 and a conductor layer 1008 on which the dielectric layer 1006 is disposed. The number, configuration, and other characteristics of the structure of the body may vary from the example shown.

FIG. 11 depicts an example of a track 1100 having a non-rectilinear configuration. Part (a) depicts a cross-sectional view of the track 1100. Part (b) depicts a plan view of the track 1100. The track 110 includes a number (e.g., three) of curved conductor layers or curved conductors 1102-1104. In this case, the track 1100 has an oval cross-sectional shape. Other curved cross-sectional shapes may be used. The multiple conductors 1102-1104 are disposed about a periphery of the track 1100. Each conductor 1102-1104 may thus also be curved in accordance with the curvature of the periphery. The conductors 1102-1104 may be mounted on, or otherwise supported by, a multi-layer substrate or other structure. As with the above-described example, the structure includes a dielectric layer 1106 and a conductor layer on which the dielectric layer 1106 is disposed. The number, configuration, and other characteristics of the structure of the body may vary from the example shown.

Figure 12:
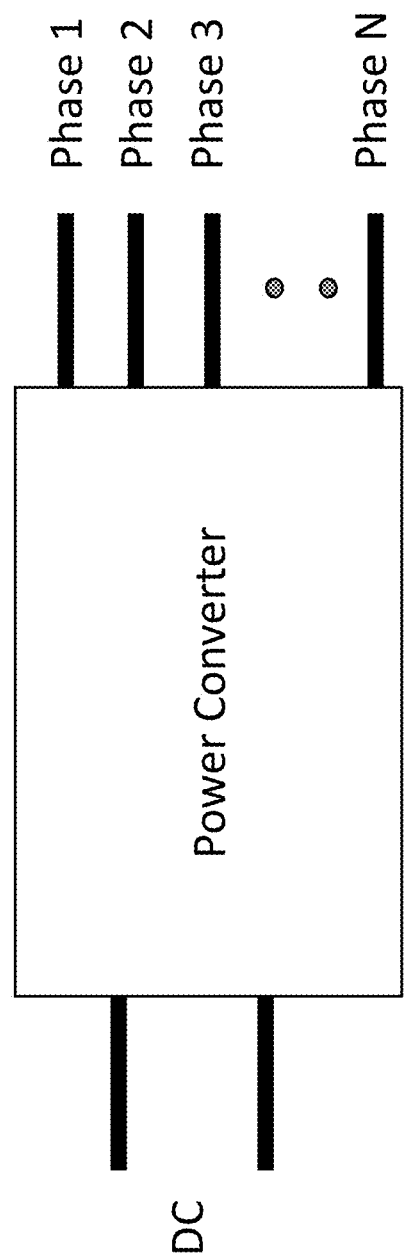
FIG. 12 is a block diagram of a power management unit of a module of a modular system in which direct current power is converted into multiple radio frequency outputs are provided in accordance with one example.

FIG. 12 depicts an example of a power management unit configured to provide RF outputs at differing electrical phases. The power management unit includes one or more power converters. In this example, the power management unit includes a power converter with a plurality of outputs, the plurality of power outputs providing radio frequency (RF) power at differing electrical phases. In other cases, the power outputs may be provided by multiple power converters.

Figure 13:
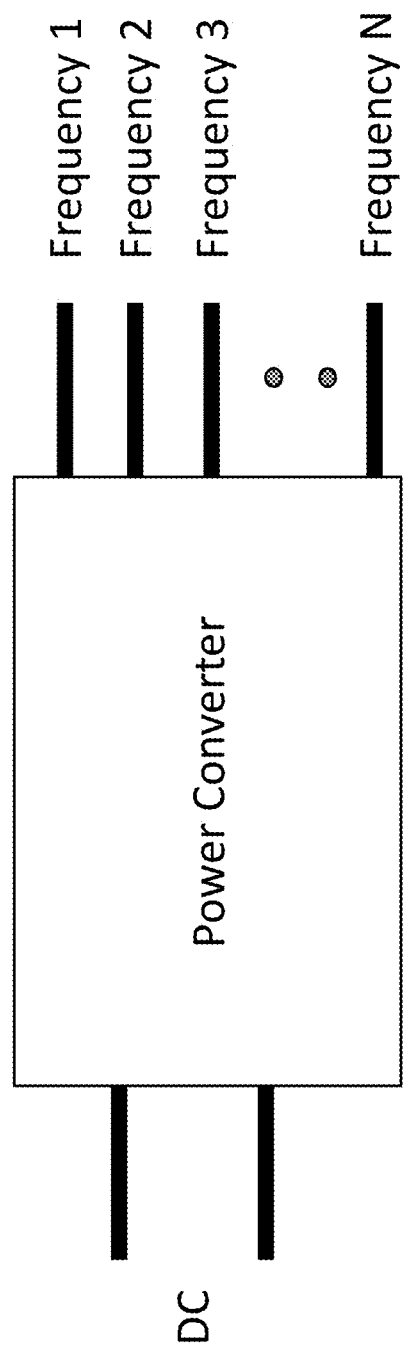
FIG. 13 is a block diagram of a power management unit of a module of a modular system in which direct current power is converted into multiple radio frequency outputs are provided in accordance with another example.

FIG. 13 depicts an example of a power management unit configured to provide RF outputs at differing frequencies. The power management unit includes one or more power converters. In this example, the power management unit includes a power converter with a plurality of outputs, the plurality of power outputs providing radio frequency (RF) power at differing frequencies. In other cases, the power outputs may be provided by multiple power converters.

Figure 14:
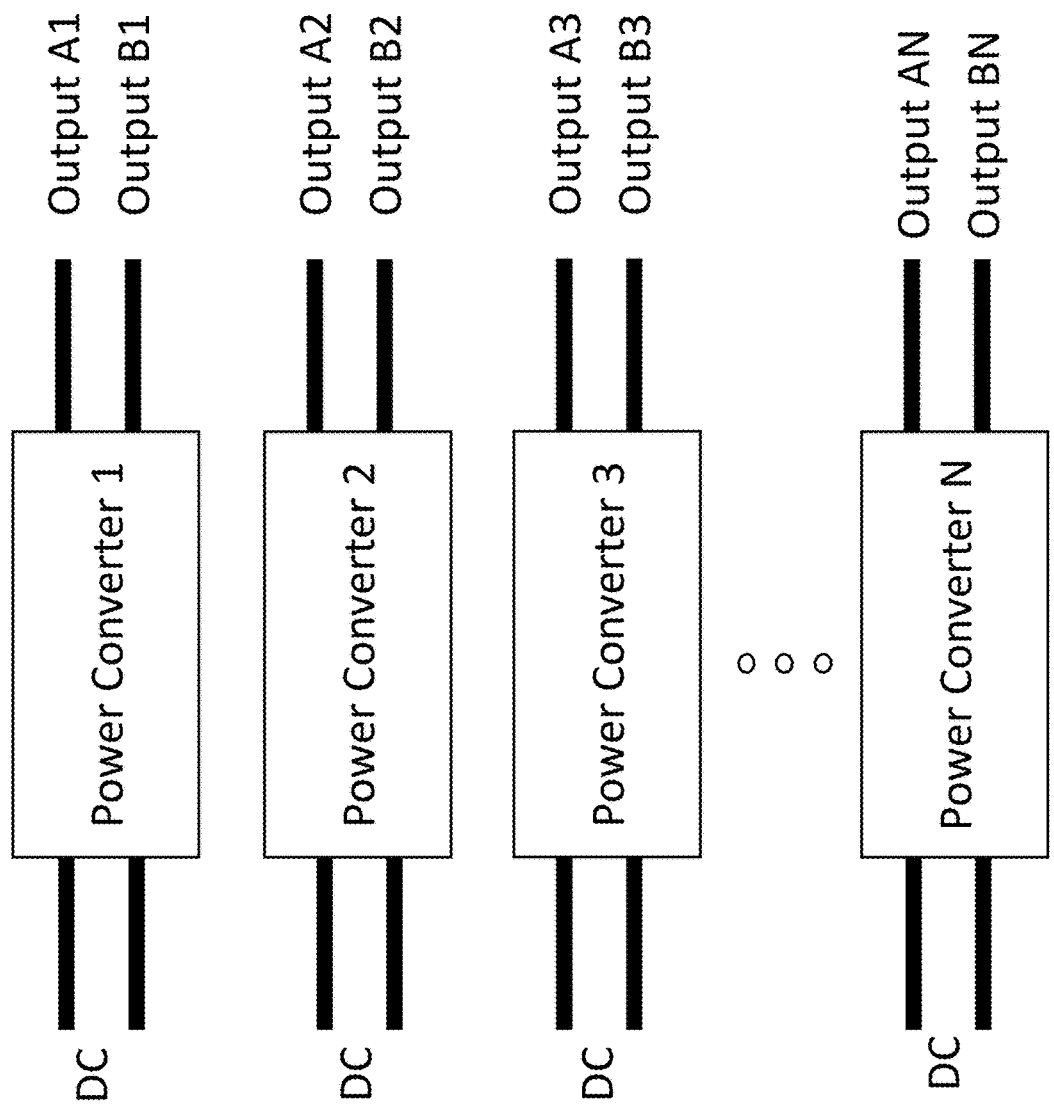
FIG. 14 is a block diagram of a power management unit of a module of a modular system having multiple converters to provide multiple radio frequency outputs in accordance with one example.

FIG. 14 depicts an example of a power management unit having multiple power converters. As described above, each power converter is configured to convert between direct current (DC) power and radio frequency (RF) power. In this example, each power converter is configured to provide multiple RF outputs. The number of RF outputs provided by each power converter may vary.

Figure 15:
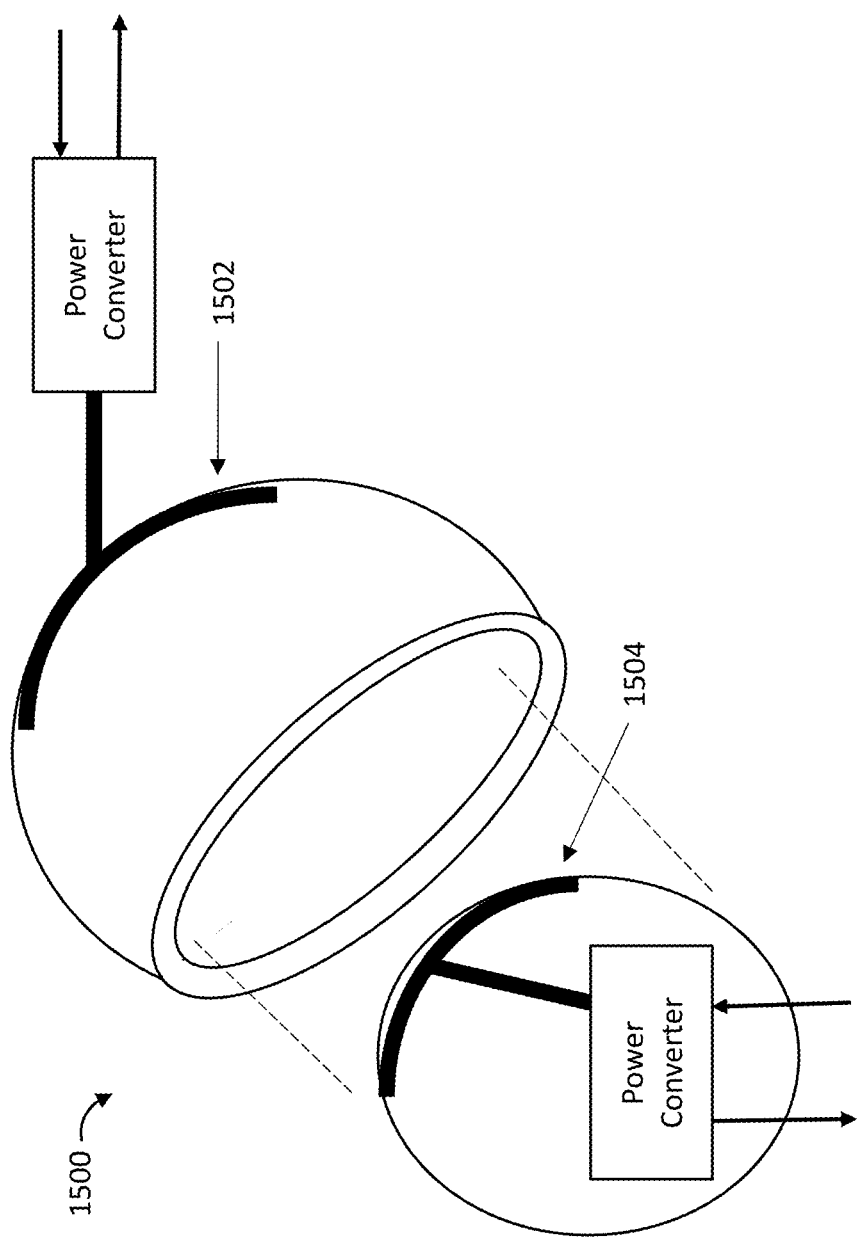
FIG. 15 is a schematic, perspective view of a system having a ball and socket joint with capacitive coupling for wireless power transfer in accordance with one example.

FIG. 15 depicts an example of a ball and socket joint 1500 through or across which power may transfer. The power transfer may be bidirectional as described herein. The joint 1500 includes a pair or curved conductors 1502, 1504. The conductor 1502 is disposed along a surface of the ball of the joint. The conductor 1504 is disposed along an inner surface of the socket of the joint 1500. The conductors 1502, 1504 are connected to respective power converters, as shown.

Figure 16:
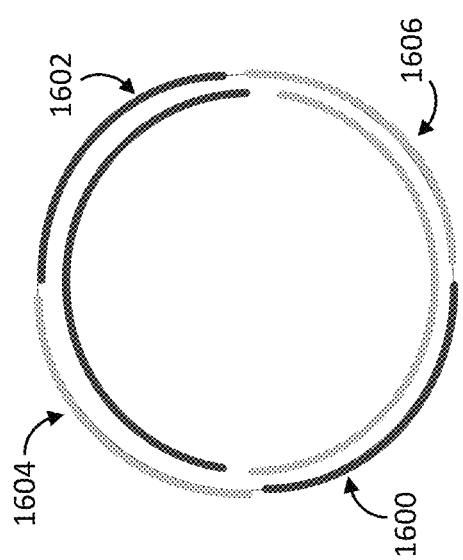
FIG. 16 is a schematic view of a capacitive coupling configuration for a ball and socket joint in accordance with one example.

FIG. 16 depicts a conductor configuration for the ball and socket joint 1500 (FIG. 15) in accordance with one example. The configuration includes a pair of conductors 1600, 1602 of the joint 1500 that are connected with one another. The configuration includes another pair of conductors 1604, 1606 of the joint 1500 that are connected with one another. The pairs of conductors may be switched depending on the position of the ball to maintain constant power flow.

Figure 17:
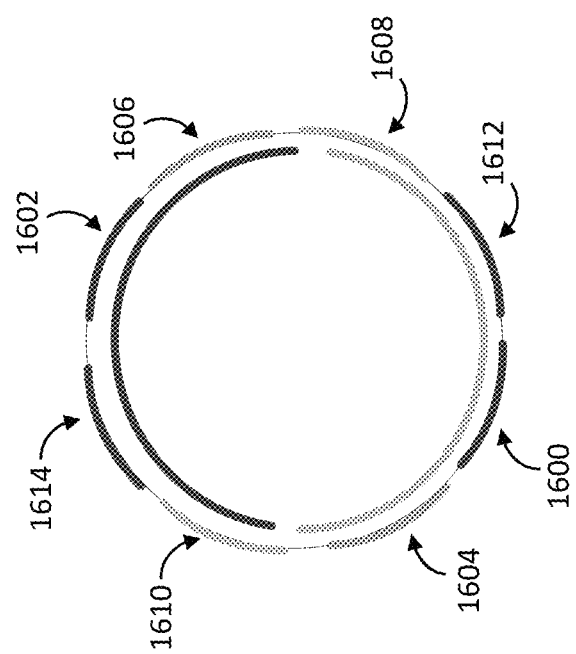
FIG. 17 is a schematic view of a capacitive coupling configuration for a ball and socket joint in accordance with another example.

FIG. 17 depicts a conductor configuration for the ball and socket joint 1500 (FIG. 15) in accordance with another example. In this case, the configuration includes four pairs of conductors. The conductors of each pair are connected with one another. The first pair includes conductors 1700, 1702. The second pair includes conductors 1704, 1706. The third pair includes conductors 1708, 1710. The fourth pair includes conductors 1712, 1714. The conductors may be excited using different frequencies and/or orthogonal codes (e.g., four in this example) to achieve selective power transfer. The conductors of the ball may also be split into multiple conductors excited by the different frequencies and/or orthogonal codes.

Figure 18:
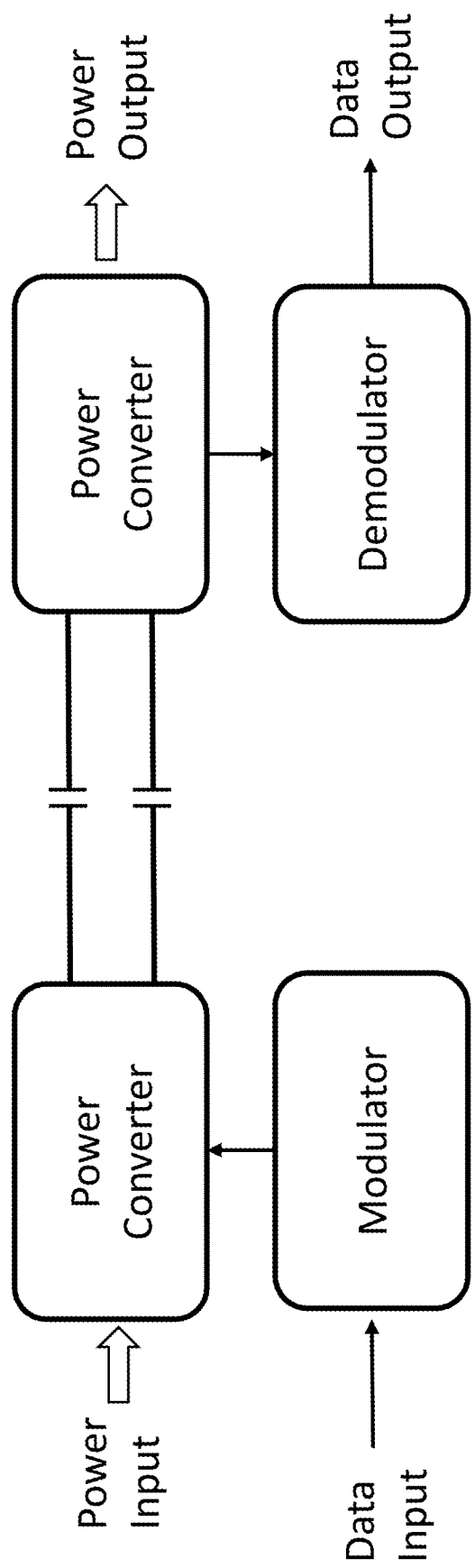
FIG. 18 is a schematic, block diagram of a capacitive coupling architecture with data-based modulation for use with any of the wireless transfer systems described herein.

FIG. 18 depicts an architecture for wireless power transfer with information transfer in accordance with one example. The architecture may be used in, or applied to, any of the examples described herein. The architecture includes a number (e.g., a pair) of power converters with a capacitive coupling as described herein. A modulator is coupled to one of the power converters. A demodulator is coupled to the other power converter. The positions of the modulator and demodulator may be reversed from the example shown. In some cases, the information flow is bidirectional such that both power converters are coupled to a modulator and a demodulator. Any modulation scheme, such as frequency and/or phase modulation, may be used for the modulation/demodulation.

Described above are systems configured to exchange electrical energy between modules. The system may be a modular robot. Each module may be or include a dynamic structure with a small battery. The disclosed systems provide a contactless solution for enabling bi-directional energy exchange between the robotic modules. To transfer the energy between the modules, capacitive wireless power transfer is employed that uses a conduction track or other path on or along the robot body. The disclosed systems may include a modified CMCDE topology for making the power transfer resilient to the changes in dimensions of the conductive path as a result of movement (e.g., relative to the robot body).

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:
1. A system comprising:
a structural body;
first and second modules disposed along, and movable relative to, the structural body, each of the first and second modules comprising an energy storage device, a plurality of terminals, and a power converter coupling the energy storage device and the plurality of terminals; and
a plurality of conductors on the structural body, the plurality of conductors establishing a conduction path between the first and second modules;

wherein the plurality of terminals of each of the first and second modules are disposed along the plurality of conductors on the structural body to establish a capacitive coupling between the plurality of terminals and the plurality of conductors for capacitive, bidirectional wireless power transfer between the first and second modules; and wherein each power converter of the first and second modules comprises a switched parallel resonant tank to support the capacitive, bidirectional power transfer between the first and second modules via the conduction path, the switched parallel resonant tank being configured to drive a series resonance, the series resonance comprising the capacitive coupling between the plurality of terminals and the plurality of conductors, an inductance of the plurality of conductors, and a compensation inductor.

2. The system of claim 1, wherein:
the plurality of conductors are arranged as a track; and
each of the first and second modules is movable along the track.

3. The system of claim 2, wherein movement along the track is linear.

4. The system of claim 2, wherein the track has a curved cross-sectional shape.

5. The system of claim 1, wherein each power converter comprises an amplifier having a current mode, hybrid class D-class E topology.

6. The system of claim 1, wherein each power converter has an inductive input impedance such that the amplifier is configured for zero-voltage switching.

7. The system of claim 1, wherein the compensation inductor of each of the first and second modules couples the switched parallel resonant tank and a respective terminal of the plurality of terminals.

8. The system of claim 1, wherein:
each of the first and second modules comprises a wall; and
the plurality of terminals comprises a conductive plate adjacent the wall such that the wall acts as a dielectric element of the capacitive coupling.

9. The system of claim 1, wherein:
each of the first and second modules comprises a wall; and
each of the first and second modules comprises a dielectric element disposed between the wall and the plurality of terminals.

10. The system of claim 1, wherein:
each of the first and second modules comprises an actuator; and
each actuator is mechanically linked to the structural body.

11. The system of claim 1, wherein the first and second modules are interchangeable.

12. The system of claim 1, wherein each of the first and second modules further comprises a modulator or a demodulator for information transfer between the first and second modules via the conduction path.

* * * * *